(12) United States Patent
Such Vicente et al.

(10) Patent No.: US 11,469,901 B2
(45) Date of Patent: Oct. 11, 2022

(54) DATA STRUCTURES

(71) Applicant: HEWLETT-PACKARD DEVELOPMENT COMPANY, L.P., Spring, TX (US)

(72) Inventors: Alberto Such Vicente, Sant Cugat del Valles (ES); Helen Balinsky, Pt. Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 26 days.

(21) Appl. No.: 16/605,316

(22) PCT Filed: Apr. 26, 2018

(86) PCT No.: PCT/US2018/029588
§ 371 (c)(1),
(2) Date: Oct. 15, 2019

(87) PCT Pub. No.: WO2019/209303
PCT Pub. Date: Oct. 31, 2019

(65) Prior Publication Data
US 2021/0377036 A1    Dec. 2, 2021

(51) Int. Cl.
*H04L 29/06*    (2006.01)
*H04L 9/32*    (2006.01)
(Continued)

(52) U.S. Cl.
CPC ............ *H04L 9/3239* (2013.01); *G06F 21/64* (2013.01); *H04L 9/50* (2022.05)

(58) Field of Classification Search
CPC .... H04L 9/3239; H04L 2209/38; G06F 21/64
See application file for complete search history.

(56) References Cited

U.S. PATENT DOCUMENTS

2016/0212146 A1    7/2016    Wilson
2017/0048217 A1*   2/2017    Biggs ............... H04L 63/123
(Continued)

FOREIGN PATENT DOCUMENTS

WO    WO-2017091530    6/2017
WO    WO-2017112664    6/2017
(Continued)

OTHER PUBLICATIONS

A possible Bitcoin fork?—Bitcoin 2: Freedom of Transaction, Jul. 24, 2013, http://dgcmagazine.com/a-possible-bitcoin-fork-bitcoin-2-freedom-of-transaction/.
(Continued)

*Primary Examiner* — Mahfuzur Rahman
(74) *Attorney, Agent, or Firm* — HP Inc. Patent Department (57) ABSTRACT

In an example, a data structure comprises a first genesis record having an associated authentication value and a plurality of subsequent records arranged in an order, wherein at least one subsequent record includes the authentication value associated with the first genesis record and an authentication value associated with another record in the data structure. A method may include designating one of the subsequent records as a second genesis record, acquiring an authentication value for the second genesis record, deleting at least one record preceding the second genesis record in the data structure and adding a further record to the data structure wherein the further record includes the authentication value of the second genesis record and an authentication value associated with a directly preceding record in the data structure.

16 Claims, 4 Drawing Sheets

(51) Int. Cl.
  *G06F 21/64* (2013.01)
  *H04L 9/00* (2022.01)

(56) References Cited

U.S. PATENT DOCUMENTS

2017/0337534 A1    11/2017  Goeringer et al.
2018/0005186 A1*    1/2018  Hunn .................... G06F 21/645
2019/0147065 A1*    5/2019  Maeda .................. H04L 9/0637
                                                   380/37
2019/0377889 A1*   12/2019  Mertens ................. G06F 21/60
2020/0322308 A1*   10/2020  Kempf ................ H04L 12/4641

FOREIGN PATENT DOCUMENTS

WO    WO-2017177260 A1     10/2017
WO    WO-2018026883 A1 *    2/2018  ........... H04L 9/3268

OTHER PUBLICATIONS

Dennis, R., et al., A Temporal Blockchain: a Formal Analysis, 2016, https://researchportal.port.ac.uk/portal/files/5324699/A_temporal_blockchain_A_formal_analysis.pdf.

Teutsch, J. et al., a Scalable Verification Solution for Blockchains, Mar. 7, 2017, https://people.cs.uchicago.edu/~teutsch/papers/truebit.pdf.

* cited by examiner

DATA STRUCTURES

BACKGROUND

Some data structures, which may be known as "hash chain" data structures are tamper-evident lists of data, for example records, such as device state logs and/or transactions, which may in some examples be financial transactions. In a hash chain, a data record in a sequence or order contains a link to a preceding data record. The link may be in the form of an authentication value, for example, a signature or 'hash' of the preceding record. Hash chains may be designed such that, once data is added thereto, a retroactive alteration of data in any given record will be evident unless all subsequent records are also altered, which may be technically complex to the extent that the integrity of a chain in which the data records which are consistent with one another may be assumed.

BRIEF DESCRIPTION OF DRAWINGS

Non-limiting examples will now be described with reference to the accompanying drawings, in which.

DETAILED DESCRIPTION

"Hash-based" data structures (also referred to herein simply as 'hash chains' and hash-trees and noting that the term as used herein refers to hash- and signature-based structures), can grow large relatively fast, especially in busy systems which may generate large number of records to be added to the chain. This can become problematic for systems with limited storage capabilities, such as for example embedded systems, and in any event can increase costs associated with memory resources. In addition, processing resources used in chain validation tend to increase with chain size. In some cases, older records may lose their value or utility over time, and may therefore consume processing and/or storage resources unnecessarily.

For the avoidance of doubt, the term 'hash chain' as used herein includes derivative techniques such as blockchains (which may be thought of as hash chains with added features such as validity conditions and disagreement resolution protocols/consensus protocols). In particular, while in general, hash chains may be built up one transaction at a time (i.e. each record may contain one transaction), in a blockchain, a group of transactions may be combined into a block before being added to the chain (i.e. each record may contain a plurality of transactions). In some examples, the records or blocks may in themselves comprise hash tree data structures (or Merkle trees), in which every leaf node is labelled with the hash of a data block and every non-leaf node is labelled with the cryptographic hash of the labels of its child nodes. Such blocks may be formed of a number of individual transactions.

The methods described herein may be carried out on hash chain data structures which may have many features of previously proposed hash chains. For example, the hash chain data structures may comprise a first genesis record having an associated authentication value (e.g. a hash or a signature) and a plurality of subsequent records arranged in an order or sequence. Each subsequent record includes an authentication value (e.g. a hash or a signature) associated with a directly preceding record in the order/sequence. In some examples, the authentication value is a cryptographic hash of the preceding record (which may in turn comprise a hash of its preceding record, and so on).

The authentication value of the first record, usually called a 'genesis record', may be the root of trust of the chain. Thus, in some examples, in order to trust the whole chain, trust in the genesis record may be established. In some examples, the genesis record may be signed by an authenticating entity (which may be a well-known or established entity) for example using a Public Key Infrastructure (PKI) certificate to enable validation of the authentication value. In some examples, some or all the records in the chain may be signed in this way. This gives the hash chain the attribute of 'non-repudiation'. In general, in some examples individual records may be signed by entities using a private key associated with a public key.

The records in a hash chain data structure are ordered and "chained" together, creating a tamper evident data structure, in which records cannot readily be modified without invalidating the data structure as a whole.

In some examples, there may be additional features or options for the sequence of records. For example, at least some of the records may be encrypted, and/or there may be different levels of access rights for each record. For example, the hash chain may be structured as a blockchain. The records may comprise the data they may be used to validate (for example, may comprise at least one log record, or a record of at least one transaction), or may comprise data derived therefrom, for example comprising a hash of the data it is intended to validate.

In some examples, the hash chain data structure may be constructed such that 'roll back' will be evident. For example, it may be possible that, unless counter measures are employed, the last record in the sequence can be removed without affecting the rest of the data structure, and the completeness of the data structure cannot be assured—i.e. the hash chain may be 'rolled back'. One example of a counter measure is to use a security value, for example a secure monotonic increasing value, such as the total number of records in the chain, or the timestamp of the last record, and storing it (usually securely, and for example digitally signed) so as to be accessible through a secure mechanism. This solution means that storage resources are provided for the security value (e.g., the monotonic increasing value of the last record) in addition to the hash chain data structure (and in some examples, export of the additional information). In some examples, the security value may be securely exported on creation to prevent tampering within a processing device storing the hash chain.

Where hash chains can be designed such that successful validation thereof provides a high assurance of integrity (or in other words that any tampering is evident), this can provide a potential solution for, for example, fully auditable log records. An example application would be a security log of a computing system or a computer controlled resource.

Hash chains (often, blockchains) have also been used in the management of cryptocurrencies.

The proposed hash chain implementations described as above are usually stored wholly and completely to allow the integrity thereof to be proved and to maintain a complete history. This can place a strain on memory and storage resources, as set out above. This is particularly the case in systems such as embedded systems, 'internet of things' devices, or the like, where storage resources may be relatively small or constrained.

Figure 1:
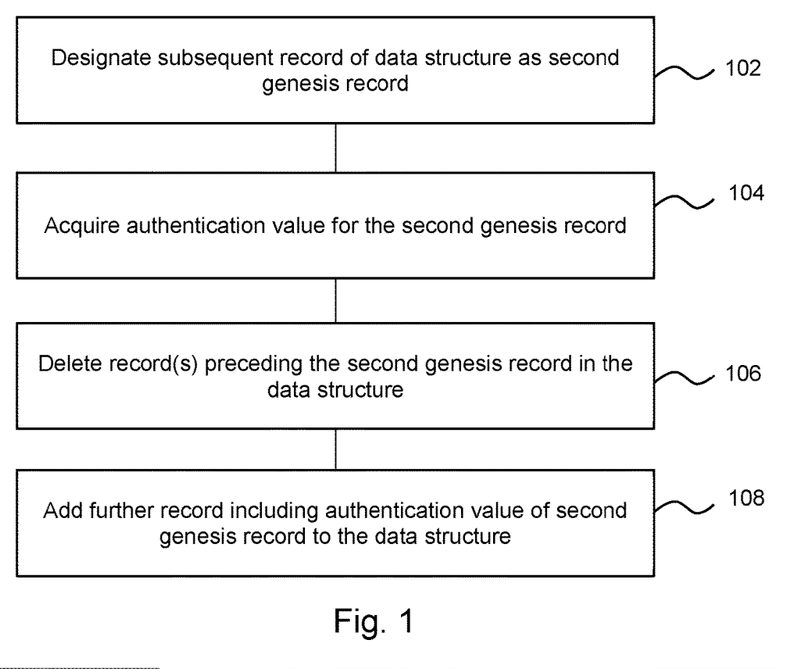
FIG. 1 is a flowchart of an example method of adding records to a data structure.

In examples set out herein, however, in addition to including an authentication value associated with a directly preceding record in the sequence, as may be seen in many hash chain variants, in this example, each subsequent record also includes the authentication value associated with a genesis record. In the example of FIG. 1, at least one subsequent record includes the authentication value of a first genesis record.

The method of FIG. 1 proceeds by, in block 102, (and in some examples following acquisition of a data structure such as the hash chain data structure detailed above) designating one of the subsequent records in a data structure as a second genesis record. As is further set out below, in some examples, this may be triggered by a condition being satisfied (e.g. the lapse of a predetermined time period, the data structure reaching a predetermined size, data records reaching a predetermined age, user input or the like). In some examples, rules for defining and accepting a subsequent genesis record may be recorded into a previous genesis record or into later transactions preceding the subsequent genesis record. Such rules may for example be enforced in 'permissioned' hash chains (for example a permissioned block chain, which comprises an access control layer to control the entities which can act as a validation authority), and/or by 'smart contract' mechanisms, which enforce contractual agreements entered into by the entities cooperating in a hash chain/blockchain.

Block 104 comprises acquiring an authentication value for the second genesis record. For example, the authentication value may be a hash, or a cryptographic signature which is generated based on the content of the second genesis record. In some examples, as described above, a certifying authority may certify the authentication value of the second genesis record. In some examples, the authentication value may have been generated previously, and may for example be stored in association, or as part of, the subsequent record which is designated as the second genesis record. In such examples, the authentication value may be acquired from a memory. In other examples, the authentication value of the second genesis record may be generated. In some examples, the authentication value of the second genesis record may be held in the record itself, may be held in the next record in the chain and/or may be generated in the process of designating a further genesis record. Generating or regenerating the authentication value at the point of designating further genesis records may provide an additional verification at the point of setting a new genesis record, and so validate that the entity establishing the new genesis record has appropriate authority to do so. In examples of such methods, asymmetric signatures may be utilised as the authentication value.

As noted above, in some examples, the first genesis record may define rule(s) for at least one subsequent genesis record, which rule(s) may or may not be varied throughout the method. For example, a genesis record may specify conditions for the next genesis record to be accepted as valid (e.g. it may specify that a subsequent record is to be signed by a named authority, has a timestamp meeting predetermined criteria, or the like).

Block 106 comprises deleting at least one of the records preceding the second genesis record in the hash chain data structure sequence. In some examples, all subsequent records including the first genesis record (or any other genesis records), or all subsequent records except the first genesis record (and, in some examples, any other genesis records), may be deleted. In other examples, a subset of the records (which may comprise older records rather than newer records) may be deleted. In some examples, one record may be deleted for and/or as each record is added.

Block 108 comprises adding a further record to the hash chain. The further record includes the authentication value of the second genesis record and a generated authentication value associated with a directly preceding record in the sequence. A new sequence of records may be built up based on the subsequent genesis record.

The method may be carried out iteratively, with the second genesis record assuming the role of the first genesis record in a subsequent iteration, and so on.

According to the method of FIG. 1, records may be deleted, which may prevent a hash chain data structure from becoming too large. The records include a reference to a genesis record (using the corresponding authentication value, e.g. a hash or signature). The genesis record to which subsequent records refer may be updated to a new genesis record, which is (for at least as long as the last data record includes its authentication value) retained in the hash chain. This enables, when adding a new record, 'advancement' of the genesis record to a record inside the chain, and also enables deletion of preceding record(s) between the original and the new genesis record.

In some examples, the records which are deleted may be a subset of the records between a previous and a new genesis record. For example, records which immediately precede a particular genesis record which is not the newest genesis record may be removed from the chain. In other words, newer records may be maintained while older records may be deleted.

In some examples, a sequence of genesis records may define 'bookmarks' within the data structure, such that a set of records between two genesis records may be selected for deletion in a single deletion operation. For example, in the case of a hash chain containing a number of genesis records and the records therebetween, if the newly added genesis record is the Nth genesis record, in some examples, records preceding genesis record N-M are removed, where N is greater than M, and N and M are integers. If however N is smaller than M, then no records are deleted, allowing the chain to grow until it includes M genesis records. In one example, records between earlier (N−1) and N genesis records are removed when (N+1) genesis record is added. Generally, such a deletion operation can be performed when the (N+1) genesis record is added/designated or retrospectively. By deleting older records (and not those directly preceding the newly added genesis record) 'historical' records may be removed while more recent records may be retained. Deleted records can be removed and discarded or offloaded to other storage (for example, a long term archive). If records are offloaded, in some examples a subsequent genesis record might contain a pointer to the storage location. If records are permanently deleted, the subsequent genesis record may contain authorization and confirmation of the data destruction.

Figure 2:
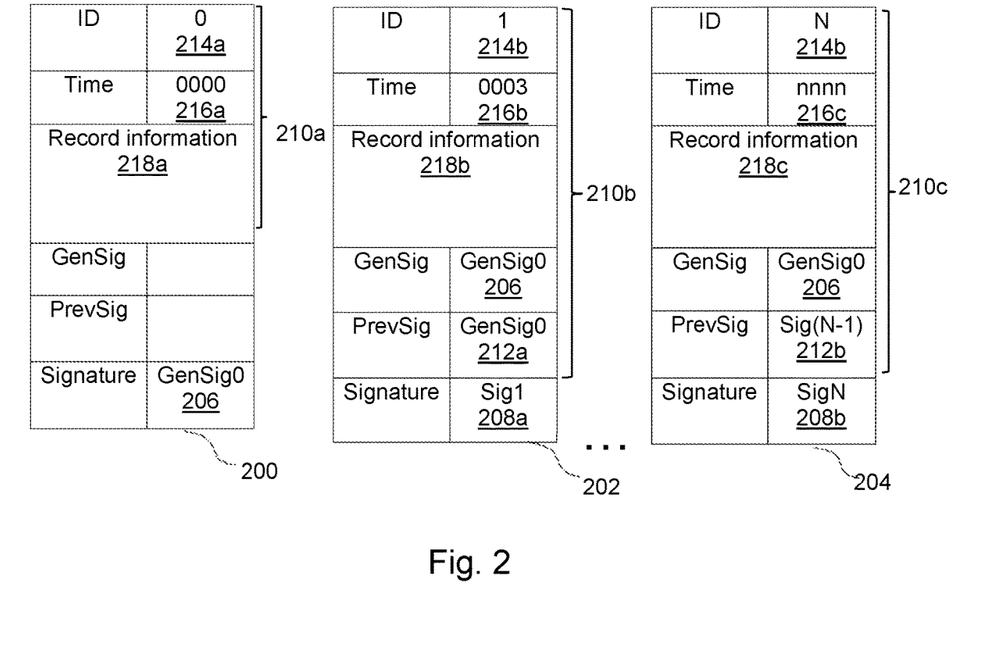
FIG. 2 shows an example of a hash chain data structure.

FIG. 2 shows a representation of a data structure according to an example as the method starts in FIG. 1. Three records are shown, the first genesis record 200, a first subsequent record 202 and an Nth subsequent record 204. The first and Nth subsequent records may be separated by none, one, or a plurality of further subsequent records, as indicated in the Figure by an ellipsis.

In this example, the first genesis record 200 comprises an authentication value, in this example a signature 206 of data 210a, and the data 210a itself, and each subsequent record 202, 204 comprises an authentication value, in this example a signature 208a, 208b for data 210b, 210c, and the data 210b, 210c itself.

In other examples, a first genesis record 200 could define the length of data structure, and/or contain rules for defining the second genesis record. In some examples, a second genesis record may be permitted to amend rules (for example to reflect increase in memory and/or processing resources, and/or a change in the size of the records, or the like, which may impact the size of a practical chain). A genesis record may also specify any or any combination of policies for data retention (for example, how long, whether full or selective backup is specified), public keys, policies for entities which may authorise the next genesis record (or a specification that next genesis record is automatically authorised by the system, for example when certain conditions are met), or the like.

In the case of the subsequent records 202, 204, the signed data 210b, 210c comprises the signature 206 of the first genesis record 200 and a signature 212a, b of the preceding record in the chain (which for the first record 202 is also the signature 206 of the first genesis record 200). In this example, the signed data 210 (i.e. the data 210 over which the signature 206, 208 is created) of all the records 200, 202, 204 comprises a record reference 214a-c which in this example is an integer which increments with each record, and a time stamp 216a-c, as well as record information 218a-c. For example in the case of a log file, the record information 218a-c may indicate an action or machine state which is entered into the log. More generally, the record information 218a-c may comprise any 'payload' or potentially useful data. In other examples, the signed data 210 may comprise any or any combination of such data 210, 212, 214, 216, and/or additional data.

More generally, a hash chain data structure as described herein comprises at least one genesis record and at least one subsequent record. Each subsequent record comprises data associated with an authentication value (e.g. a hash or signature of that data), the data comprising (i) an authentication value of a genesis record, (ii) an authentication value of the preceding data record in the hash chain data structure. The data associated with the authentication value may also comprise record information, and/or in some examples, additional data such as an identifier and/or a time stamp. The hash chain data structure may further comprise rules for the hash chain, for example setting out the rules for establishing and/or validating a genesis record. In some examples, such rules may be set out in at least one genesis record.

In the hash chain data structure, each subsequent record may refer to the same genesis record for all subsequent records and/or, as some examples of the methods described herein progress, may include authentication values for different genesis records.

Table 1 is illustrative of an example implementation of the method of FIG. 1.

TABLE 1

| Record index | Content of data structure | Number of records |
|---|---|---|
| 0 | $G_1$ | 1 |
| 1 | $G_1$, $R_1$ | 2 |
| 2 | $G_1$, $R_1$, $R_2$ | 3 |
| . | . | . |
| . | . | . |
| N − 2 | $G_1$, $R_1$, $R_2$, ..., $R_{N-2}$ | N − 1 |
| N − 1 | $G_1$, $R_1$, $R_2$, ..., $R_{N-2}$, $R_{N-1}$ | N |
| N | $G_1$, ~~$R_1$~~, $R_2 = G_2$, $R_3$, $R_4$, $R_5$, ..., $R_{N-2}$, $R_{N-1}$, $R_N$ | N |
| N + 1 | $G_1$, ~~$R_1$~~, ~~$R_2$~~ $R_3 = G_3$, $R_4$, $R_5$, ..., $R_{N-2}$, $R_{N-1}$, $R_N$, $R_{N+1}$ | N |
| N + 2 | $G_1$, ~~$R_1$~~, ~~$R_2$~~ ~~$R_3$~~ $R_4 = G_4$, $R_5$, ..., $R_{N-2}$, $R_{N-1}$, $R_N$, $R_{N+1}$, $R_{N+2}$ | N |
| N + 3 | $G_1$, ~~$R_1$~~, ~~$R_2$~~ ~~$R_3$~~ ~~$R_4$~~ $R_5 = G_5$, ..., $R_{N-2}$, $R_{N-1}$, $R_N$, $R_{N+1}$, $R_{N+2}$, $R_{N+3}$ | N |

In Table 1, the data structure grows from a first genesis record $G_1$ with records R being added until it contains a total of N records. In this example, it is assumed that N is a threshold maximum size for the data structure. At this point, as was also described in relation to block 102, a record in the data structure (in the example of Table 1, $R_2$), is selected as a second genesis record $G_2$. The authentication value of $R_2$ may be retrieved from the record $R_2$, or in some examples a new authentication value may be determined (for example, by reference to a certifying authority), as also described in relation to block 104 above.

The record $R_N$ may be added with data which includes the authentication value of $R_2$ as well as the authentication value of $R_{N-1}$ (and any other data of interest, as described with reference to FIG. 2), as also described in relation to block 106 above. $R_1$ is then deleted as also described in relation to block 108 above, and the size of the data chain is not increased. To consider a record as shown in FIG. 2, the genesis signature 200 of $R_{N-1}$ would be the signature of record G, but the genesis signature 200 of $R_N$ would be the signature of record $R_2$.

In the example of Table 1, this then continues with each new record which is added resulting in the designation of a new genesis record and the deletion of a preceding record (i.e. a 'one in, one out' system). Thus, the hash chain, which may be a block chain, and may be a block chain in which the individual blocks are constructed as Merkle trees), remains the same length/size once an initial length/sized has been reached. In other examples, a plurality of records may be purged or deleted in a single iteration, and the genesis record advanced by more than one index. In some examples records which have aged past a predetermined age (which may be linked to the usefulness of the data, which may degrade over time) may be deleted and/or the new genesis record may be selected from data which is more recent. In Table 1, the original genesis record is retained, but this need not be the case in all examples. In other examples, all genesis records may be retained.

In some examples, when the size of the data structure is fixed as in Table 1, to allow for a consistent application of the method, the data structure may be initialised with dummy or null data to make the data structure the agreed size.

In one example, the generic structure of a data structure may be described as:

$G_1$-$R_{12}$-$R_{12}$ ... -$G_2$-$R_{21}$-$R_{22}$ ... -$G_3$- ... -$G_N$-$R_{N1}$— ...

where $G_i$ is $i^{th}$ genesis block and $R_{ij}$ is $j^{th}$ record after $i^{th}$ genesis block The data structure described may be verified as described by the following pseudo code:

```
record = last_record
while record != genesis_record {
verify record using its authentication value
verify that prevAuthVal is equal to the authentication value of
previous record
record = previous record
}
verify that Genesis authentication value in last_record is equal to
authentication value of genesis record
verify genesis_record
```

Figure 3:
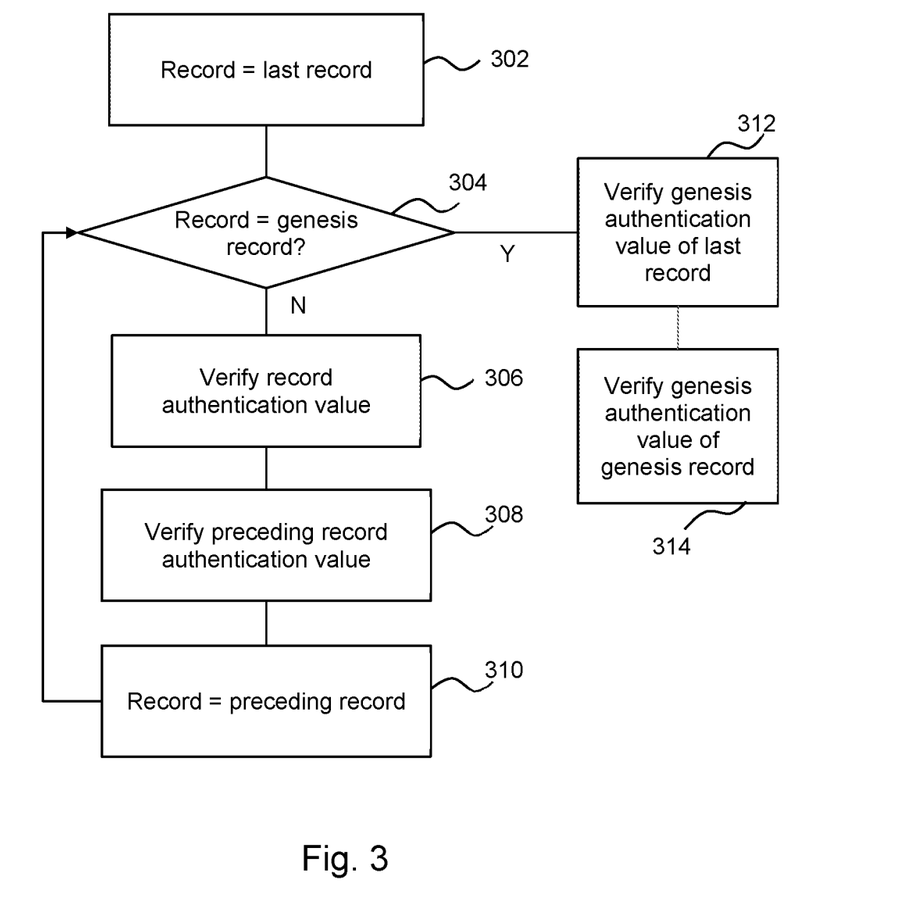
FIG. 3 is a flowchart of an example method of validating a hash chain data structure.

FIG. 3 shows an example of a method of verification. Starting from the last record (block 302), and for as long as the record is not the currently designated genesis record ("!=" indicating "not equal to" in the pseudo code above, block 304), the records are, in block 306 verified using its authentication value and/or, in some examples, by verifying that the stored authentication value was produced by an authorised entity). Authentication value verification depends on the types of authentication value used. For example, for hashes, the hash may be recalculated based on the data over which the original hash was calculated. For symmetric signatures, such as HMAC, the signature may be recalculated, based on knowledge of the symmetric signature key. For asymmetric signatures, a verification operation of the signature (which is generated using a private key) may be performed using a public key. In some examples, the validity of the authentication value may be determined in some other way to prove the authenticity of the signed material.

To consider the case of an asymmetric signature in a little more detail, a computed digital signature may depend on the following parameters: input data, a private signature key used to sign the data and a signature algorithm. Given data with a digital signature, and knowing the public key corresponding to the private key used when computing the signature and also knowing the algorithm used, it is possible to verify the signature, asserting that data was indeed signed by that private key and was not modified since.

The method proceeds in block 308 by checking that the authentication value of the previous record held in the signed data of the record under consideration does indeed match the authentication value of the previous record as held in that previous record. In other words, for record i, it is verified whether the authentication value of record i−1 held in record i matches the authentication value of record i−1 stored in record i−1. The record index is then decremented (block 310), and the verification of each record can iterate through the chain.

It is also verified in block 312 that the authentication value for genesis record in the last record does indeed match the authentication value of the genesis record itself. For example, verifying the final data structure formed in Table 1 would mean verifying that the authentication value of the genesis record stored in the last record $R_{N+3}$ does indeed match the authentication value of $R_5$ (and, in some examples, is signed by an authorised entity).

Finally, in this example, the current genesis record is verified in block 314, for example by computing a signature/hash of its content and determining if this matches the predetermined signature/hash (and, in some examples, is signed by an authorised entity). Other verification methods may include any or any combination verifying that the genesis record was created by a specific trusted entity (using the digital signature from that entity), verifying that the genesis record meets timing, or content specification, or the like.

The verifications may be carried out in any order, or in parallel.

In some examples, if a chain of genesis records has been retained in the data structure, these records may be verified back through the chain to an original genesis record, i.e. the current genesis record may be verified internally by computing a signature/hash of its content and determining if this matches the predetermined signature/hash (and, in some examples, is signed by an authorised entity), and also may be verified against a previous genesis record by checking the signed data of each genesis record contains an authentication value which matches the authentication value of the previous genesis record.

In other words, when verifying the data structure produced by the method of FIG. 1, the verification method may comprise comparing a genesis authentication value stored in a final record of the sequence with an authentication value of one genesis record in the hash chain, and comparing a genesis authentication value stored in that genesis record with the authentication value of a previous genesis record in the chain.

The choice of keeping the original genesis record may, in some examples, depend on the level of trust in entities generating the records. If, in a particular implementation, there is enough trust, then the original genesis and any intermediate genesis records may be deleted. In yet another example, the original genesis record with or without subsequent genesis record(s) might be retained, whilst the data between them maybe removed.

However, where an original genesis record is associated with a higher level of trust than subsequent records, the original genesis record(s) may be retained for verification processes. In such examples, the genesis record may be advanced by a number of records at once to allow contraction of the data structure while retaining historic genesis records.

In light of such verification processes, the hash chain data structure maintains its integrity. It may also be noted that there is resilience to rollback attacks: only records ahead of the last genesis record advance can be removed without compromising the integrity property as otherwise the last record would refer to a genesis record that is not available, and the verification procedure would fail at that point. This is particularly robust in the example as set out in Table 1, where the genesis record is advanced one record at a time. For example, if record $R_{N+3}$ was removed in a rollback attempt (noting $R_{N+3}$ includes as its genesis authentication value the genesis authentication value of $R_5$), $R_{N+2}$ would be the last record but an attempt to verify its genesis authentication value against the genesis authentication value of $R_4$ would fail, as $R_4$ has been deleted. However, even if records are removed in batches, there is some resilience to rollback. Moreover, in some examples, where deletion occurs when the chain reaches a predetermined size, rollback may be detectable if the chain is too small.

In some examples, verification may be carried out before the genesis record is advanced to a new genesis record.

Figure 4:
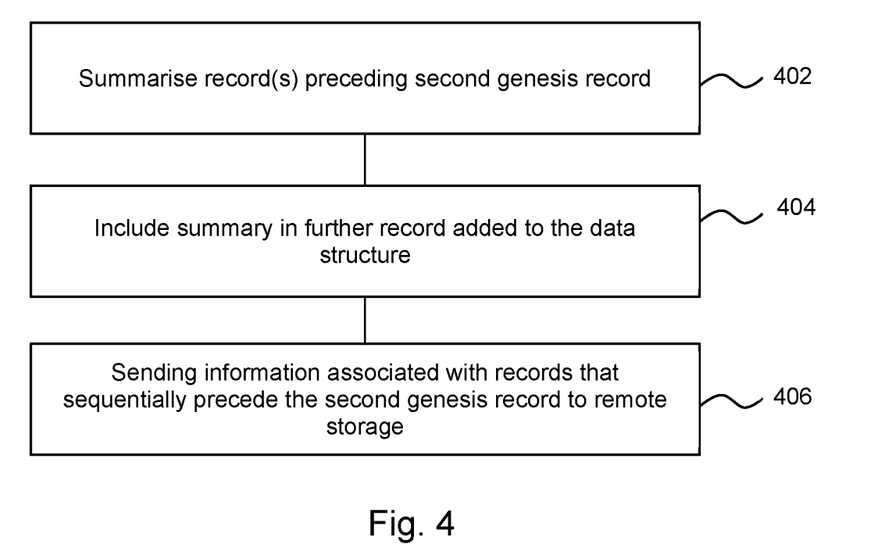
FIG. 4 is a flowchart of an example method of summarizing and backing up data records from a hash chain data structure.

FIG. 4 is an example of a method of backing up data prior to deletion. Block 402 comprises producing a summary of the record(s) that sequentially precede the second genesis record in the hash chain data structure. For example, summarised data may be a selection of the data within the records, or may comprise retaining the most significant bits of records or the like. For example, in a system where the hash chain logs transactions of an asset (such as cryptocurrency) between a limited set of participants, the summary may comprise information indicative of the status of the distribution of the assets between the different participants in the last record to be deleted. For example, in the case of financial transactions, data may be summarised to include incomplete and/or unspent transactions (which may be associated with a monetary value). In case of security logs, data relating to issues which are categorised as serious or important (for example, which relate to a valuable asset) may be retained in summarised data whereas data which falls below an importance threshold may be removed. The methods employed in summarizing the data may depend on the specific application and/or importance of the data concerned, and/or available resources. In some examples, data may be summarised in such a way that the final state of the data prior to summarisation may be reproduced.

Block 404 comprises including the further record added to the hash chain, wherein the further record includes the summary. Although the complete information on the older transactions may not be retained within the data structure, elements therein or thereof may be. In the example of retaining the distribution of assets given above, this may allow a 'starting state' to be determined, with the following records providing an indication of how the assets may have been transferred given this starting state.

Block 406 comprises backing up data in to-be-deleted records by sending information associated with records that sequentially precede the second genesis record in the hash chain data structure to remote data storage prior to deletion of those records. For example, data records which are to be removed from the data structure may be transmitted to a server or other storage resource, for example via an intranet or internet, which may store the records. In one example, the remote data storage may comprise non-volatile storage, whereas the hash chain data structure may be stored in a cache or the like. Remote data storage may comprise any storage which is distinct from the memory resource holding the hash chain data structure (and may be geographically remote or local to the memory resource holding the hash chain data structure). This may for example allow a total log history of data records to be maintained, while freeing up memory resources for the hash chain data structure.

Thus, the methods described above may be utilised in resource constrained apparatus, for example apparatus that cannot afford to store an indefinitely long hash chain data structure. An example would be storing security logs in a device with limited storage resources. In some examples, such a device may comprise a device with a primary function which is not computing—for example, a printer or printing apparatus, a sensor, or the like.

In some examples, a maximum limit on the size of the hash chain data structure may be set (for example as a number of records, or as a number of bytes), and this may drive the advancement of the genesis record and the deletion of previous records. In other examples, systems may be provided which have a right or indeed an obligation to 'forget' some of the information in the hash chain. For example, due to regulations, some information should not be stored for more than a certain amount of time. With the proposed scheme it would be possible to remove old records when the regulated storage time is over. In other examples, a user may set or trigger a 'purge' or deletion of at least one data record.

Figure 5:
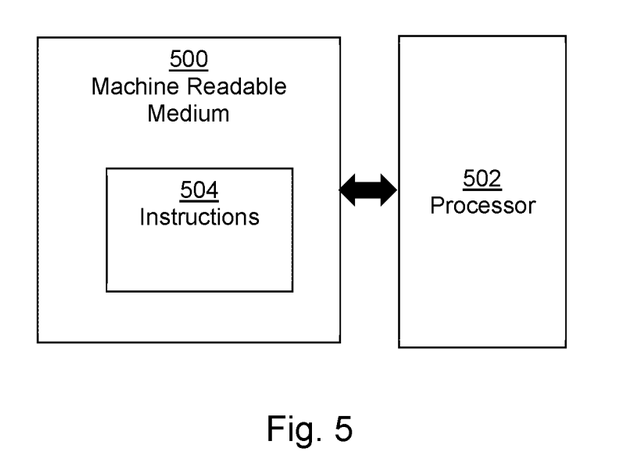
FIG. 5 is a representation of an example of a processor in association with a machine readable medium.

FIG. 5 is an example of a non-transitory machine readable storage medium 500 in association with a processor 502. The non-transitory machine readable storage medium 500 stores instructions 504, which, when executed by the processor 502, cause the processor 502 to:

(i) acquire a hash chain data structure comprising a first genesis record having an associated authentication value and a plurality of subsequent records arranged in sequence/order, wherein at least one subsequent record includes an authentication value associated with the first genesis record and an authentication value associated with a directly preceding record in the hash chain data structure;

(ii) designate one of the subsequent records as a subsequent genesis record; delete at least one of the subsequent records preceding the subsequent genesis record in the hash chain data structure; and, (iii) for at least one further record to be added to the hash chain data structure, to include an authentication value associated with the subsequent genesis record and an authentication value associated with a directly preceding record in the hash chain data structure.

In some examples, the instructions 504, when executed, cause the processor 502 to automatically designate a replacement genesis record and delete at least one of the subsequent records preceding the subsequent genesis record according to a predefined rule. For example, the rule may be based on the size of the data structure, an age of records, a class of the records or the like.

For example, designating one of the subsequent records as a subsequent genesis record may occur when a predetermined condition is met. The predetermined condition may comprise at least one of: an elapse of a predetermined time period, the hash chain data structure reaching a predetermined size, a condition specified in a preceding genesis record, a user input, or the like.

In some examples, a preceding genesis record may store rules which a subsequent record should satisfy in order to be designated as a subsequent genesis record. Once a record satisfying 'next genesis record' conditions is added to the chain, it may be validated and the record may be used as a new genesis record.

In some examples, the instructions 504, when executed, cause the processor 502 to back up information associated with records to be deleted from the hash chain sequence to a server prior to deletion of those records and/or to produce a summary of the records that sequentially precede the subsequent genesis record in the sequence prior to deletion of those records. In some examples, the instructions 504, when executed, cause the processor 502 to include the summary. In the further record added to the hash chain. For example, the instructions may cause the processor 502 to carry out the method of FIG. 1, 3 or 4.

In some examples, the instructions 504, when executed, cause the processor 502 to verify the hash chain data structure.

Figure 6:
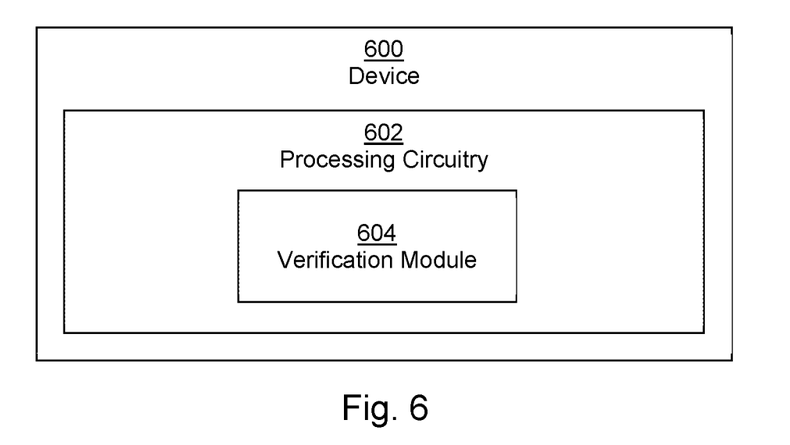
FIG. 6 is a representation of an example device comprising processing circuitry.

FIG. 6 is an example of a device 600 comprising processing circuitry 602 and a hash chain verification module 604.

In use of the device 600, the hash chain verification module 604 verifies a hash chain data structure of data records comprising at least one genesis data record and a plurality of subsequent data records arranged in sequence, wherein the subsequent data records in the sequence each includes data and an authentication value for the data, and the data comprises an authentication value of a genesis data record and an authentication value of the preceding data record.

The verification comprises, for each subsequent data record, verifying each data log record authentication value and the authentication value of the preceding data log record, and wherein verifying the last subsequent data record comprises verifying the authentication value of the genesis data log record included in the last subsequent data record. For example, the verification may be a verification as described in FIG. 3.

Figure 7:
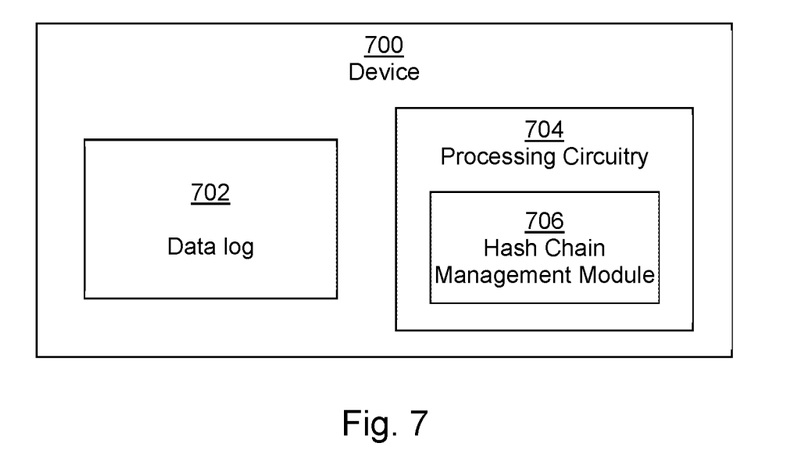
FIG. 7 is a representation of another example device comprising processing circuitry.

FIG. 7 shows another example of a device 700, which comprises a data log 702 to store data records associated with a device state and processing circuitry 704.

The processing circuitry 704 comprises a hash chain management module 706 which, in use of the device 700, creates a hash chain data structure of the data records comprising a genesis data record and a plurality of subsequent data log data records arranged in a sequence, wherein the subsequent data log data records in the sequence each include a genesis authentication value. The hash chain management module 706 also designates a record of the sequence as a new genesis record according to predetermined criteria (for example, user input, data age, data structure size, or the like), and deletes at least one data log data record preceding the new genesis record in the sequence. The new genesis record may be a genesis record for at least one further subsequent data log data record to be added to the hash chain data structure.

In some examples, the hash chain management module 706 adds a further record to the hash chain data structure, wherein the further record includes the authentication value of the new genesis record and a generated authentication value associated with a directly preceding record in the sequence.

The data log 702 may comprise a memory resource, for example a memory cache, solid state memory, volatile memory, non-volatile memory or the like.

In some examples, the device 700 may comprise a hash chain verification module 604 as described in relation to FIG. 6.

Examples in the present disclosure can be provided as methods, systems or machine readable instructions, such as any combination of software, hardware, firmware or the like. Such machine readable instructions may be included on a machine readable storage medium (including but is not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus and devices (for example, a hash chain verification module 604 and/or the hash chain management module 706) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g. a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    acquiring a data structure comprising a first record and subsequent records arranged in a sequence, wherein the first record is a first genesis record having a first genesis authentication value based on content of the first genesis record and each of the subsequent records includes the first genesis authentication value of the first genesis record and an additional authentication value of a directly preceding record in the data structure;
    designating a last record of the subsequent records in the data structure as a second genesis record;
    generating a second genesis authentication value for the second genesis record based on content of the second genesis record;
    deleting at least one of the subsequent records preceding the second genesis record in the data structure to shorten the data structure; and
    in response to a new record being added to the data structure and being verified, adding, to the new record, the second genesis authentication value of the second genesis record and an authentication value of a record that is directly preceding the new record in the data structure.

2. The method according to claim 1, wherein deleting at least one of the subsequent records preceding the second genesis record in the data structure comprises deleting each of the subsequent records preceding the second genesis record in the data structure.

3. The method according to claim 1, further comprising: authenticating the data structure, wherein authenticating the data structure comprises:
validating a genesis authentication value stored in a final record. of the data structure with the second genesis authentication value of the second genesis record in the data structure; and
validating, for each subsequent record, the additional authentication value associated with the directly preceding record in the data structure.

4. The method according to claim 1, further comprising: backing up data in deleted records by sending information associated with records that sequentially precede the second genesis record in the data structure to remote data storage prior to deletion of those records.

5. The method according to claim 1, further comprising: producing a summary of the at least one subsequent record that precedes the second genesis record in the data structure prior to deletion of the at least one subsequent record.

6. The method according to claim 5, wherein the new record added to the data structure includes the summary.

7. A non-transitory machine readable storage medium storing instructions, which, when executed by a processor, cause the processor to:
acquire a data structure comprising a first record and subsequent records arranged in a sequence, wherein the first record is a first genesis record having a first genesis authentication value based on content of the first genesis record and each of the subsequent records includes the first genesis authentication value of the first genesis record and an additional authentication value of a directly preceding record in the data structure;
designate a last record of the subsequent records in the data structure as a second genesis record;
generate a second genesis authentication value for the second genesis record based on content of the second genesis record;
delete at least one of the subsequent records preceding the second genesis record in the data structure to shorten the data structure; and
in response to a new record being added to the data structure and being verified, include, in the new record, the second genesis authentication value of the second genesis record and an authentication value of a record that is directly preceding the new record in the data structure.

8. The non-transitory machine readable storage medium according to claim 7, further comprising instructions which, when executed, cause the processor to validate the data structure.

9. The non-transitory machine readable storage medium according to claim 7, the instructions comprising instructions to designate the last record of the subsequent records as the second genesis record when a predetermined condition is met, the predetermined condition comprising at least one of: an elapse of a predetermined time period, the data structure reaching a predetermined size, or a particular condition specified in the first genesis record.

10. The non-transitory machine readable storage medium according to claim 7, further comprising instructions which, when executed, cause the processor to back up information associated with records to be deleted from the data structure to a remote data storage prior to deletion of those records.

11. The non-transitory machine readable storage medium according to claim 7, wherein the instructions further cause the processor to produce a summary of the at least one subsequent record that precedes the second genesis record in the data structure prior to deletion of the at least one subsequent record.

12. The non-transitory machine readable storage medium according to claim 11, wherein the instructions which, when executed, cause the processor to add the summary to the new record prior to adding the new record to the data structure.

13. A device comprising:
processing circuitry; and
a memory storing instructions that, when executed by the processing circuitry, cause the processing circuitry to:
acquire a data structure of data records comprising a first data record and a plurality of subsequent data records arranged in a sequence, wherein the first data record is a first genesis data record having a first genesis authentication value based on content of the first genesis data record, and each of the subsequent data records includes the first genesis authentication value of the first genesis data record and an additional authentication value of an immediately preceding data record in the data structure,
designate a last data record of the subsequent data records in the data structure as a second genesis data record,
generate a second genesis authentication value for the second genesis data record based on content of the second genesis data record,
delete at least one of the subsequent data records preceding the second genesis data record to shorten the data structure; and
in response to a new data record being added to the data structure and being verified, add, in the new data record, the second genesis authentication value of the second genesis data record and an authentication value of a data record that is immediately preceding the new data record in the data structure.

14. The device according to claim 13, further comprising: a data log to store data-log data records associated with a device state; and
the instructions further cause the processing circuitry to:
create a data structure of the data-log data records comprising a first genesis data-log data record and a plurality of subsequent data-log data records arranged in sequence, wherein the first genesis data-log data record includes a first genesis authentication value, and each of the subsequent data-log data records includes the first genesis authentication value of the first genesis data-log data records,
designate one of the subsequent data-log data records of the sequence as a new genesis data-log data record according to predetermined criteria, wherein the new genesis data-log data record includes a new genesis authentication value, and
delete at least one of the subsequent data-log data records preceding the new genesis data-log data record in the sequence.

15. The device according to claim 14, wherein the instructions further cause the processing circuitry to: add a further data-log data record to the data structure of the data-log data records, wherein the further data-log data record includes the new genesis authentication value of the new genesis data-log data record and another authentication value of a data-log data record directly preceding the further data-log data record in the sequence.

16. The device according to claim 13, wherein the instructions, when executed, further cause the processing circuitry to:
  for each subsequent data record, verify the first genesis authentication value of the first genesis data record and the additional authentication value of the immediately preceding data record in the data structure.

* * * * *